Oct. 13, 1953  R. ANNEN  2,655,416
LUBRICATING DEVICE
Filed April 10, 1950

Inventor
Robert Annen
by Karl Michaely atty

Patented Oct. 13, 1953

2,655,416

UNITED STATES PATENT OFFICE 2,655,416

LUBRICATING DEVICE

Robert Annen, Bienne, Switzerland, assignor to Roulements a Billes Miniatures S. A., Bienne, Switzerland Application April 10, 1950, Serial No. 154,970
In Switzerland May 5, 1949

5 Claims. (Cl. 308—134.1)

The present invention relates to lubricating devices, and more especially to devices for automatically lubricating bearings of vertical shafts. The invention relates particularly, though by no means exclusively, to the bearings of shafts in gyroscopes.

The lubrication of bearings of vertical shafts rotating at high speed, where friction is to be reduced to a minimum, poses serious problems. The prior art has attempted to cope with these problems by the introduction, into the bearings, of a very small quantity of oil which had to be renewed frequently. This procedure has been followed, for example, in lubricating the ball bearings of gyroscopes. Frequent renewal of the lubricant, however, has the serious disadvantage of requiring cleaning and, consequently, taking the device apart every time the lubricant had to be exchanged, thus involving, manifestly, an excessively costly procedure.

The primary object of this invention is to eliminate the frequent renewals of the lubricant, and the disadvantages resulting therefrom.

Other objects, and the manner in which the same are attained, will become apparent as this specification proceeds.

The invention contemplates the enclosure of each of the bearings in an envelope comprising a trough-shaped portion located below the bearing and constituting an oil reservoir from which the oil is elevated to the bearing during rotation of the shaft, by means of a shaft portion having an upwardly increasing diameter, the envelope portion penetrated by the shaft being spaced from the latter by a capillary gap whereby to prevent the oil from escaping from the space in which the bearing is enclosed.

The annexed drawings illustrate, diagrammatically and by way of example, several embodiments of the lubricating device according to the invention.

Figure 1:
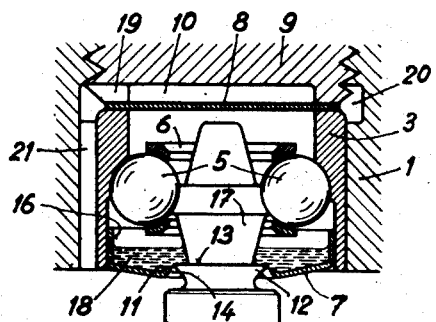
Figs. 1, 2 and 3 are longitudinal sectional views of a first, second and third embodiment, respectively, adapted to ball bearings, roller bearings and sliding bearings, respectively.

Referring now to the drawings wherein like elements are indicated by identical reference numerals, and first to Fig. 1, a housing 1 is shown to enclose an apparatus comprising a vertical shaft 2. The upper and lower ends of this shaft rotate in bearings comprising outer race-rings 3 and 4, respectively, and rows of balls 5 and 5', respectively, mounted in cages 6 and 6', respectively.

The ring 3 forming part of the upper bearing is pressed into a bore of the housing 1 and constitutes the cylindrical portion of an envelope enclosing the bearing. This envelope is closed at its lower end by a trough 7 made of hardened steel, for example, and at its upper end by a membrane 8 made of synthetic material such as synthetic rubber, for example; the peripheral portion of this membrane is pressed down onto the upper end face of the ring 3 by means of a screw 9 having a central recess 10.

Figure 4:
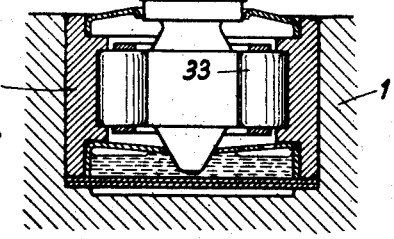
Fig. 4 is a partly sectional view of a detail of any one of the three embodiments on an enlarged scale.

The trough 7 has a central aperture bordered by a conical tubular portion 11. This portion 11 surrounds a conical collar 12 provided on shaft 2, with a clearance not exceeding in width some hundredths of millimeter. As shown in Fig. 4, the upper edge of the tubular portion 11 approaches the plane of the base 13 of collar 12 without reaching it entirely. The clearance between the portion 11 of the trough 7 and the edge of the collar 12 of shaft 2, creates a capillary gap 14, permitting the trough 7 to act as an oil reservoir preventing escape of the oil whether the shaft rotates or not. During rotation of the shaft the oil adhering to the collar 12 and to the bottom portion 11 along the capillary gap, is thrown into the reservoir along the edge 15 which, as has been described above, is located in a plane above that of the upper edge of the tubular portion 11 of the trough 7. The trough 7 also has a peripheral or flange portion 16 pressed into the ring 3, and which extends to a certain plane; a shaft portion 17 now to be described, extends to substantially the same plane.

The shaft portion 17 has an inverted frusto-conical section, its diameter increasing upwardly from the base 13 of the collar 12 to the inner raceway of the bearing, which raceway has been worked into the material of shaft 2. During rotation of the shaft, the body of oil contained in the reservoir 18 climbs along the shaft portion 17 owing to the combined action of the centrifugal force and the surface tension. After having lubricated the inner and outer raceways, the oil returns to the reservoir 18 along the inner peripheries of ring 3 and the flange 16.

The central recess 10 in the screw 9 is connected with the space below the trough 7, by a notch 19 provided in the screw 9, and by an annular groove 20 and a longitudinal channel 21 provided in casing 1. Thus, the central portion of the membrane 8 is free to move to permit expansion of the air contained in the space enclosed by the ring 3, to prevent it from forcing the oil back under pressure through the capillary gap 14 between the trough 7 and the collar 12.

This upper bearing, together with its lubricating device might also be used as a lower bearing.

The lower bearing shown in Fig. 1 is also enclosed in an envelope whose cylindrical portion is constituted by the outer race-ring 4 and closed at its bottom end by a disc 22, made of a slightly compressible material, and having its peripheral portion clamped between a shoulder 23 of the housing 1 and the lower end face of the race-ring 4. At its upper end, the envelope is closed by a cover 24 whose peripheral flange 25 is pressed into the race-ring 4, an internal flange 26 bordering an aperture in this cover, surrounding a collar 27 provided on shaft 2, with a clearance of a width not exceeding some hundredths of a millimeter, thus creating a capillary gap 28.

The lower portion of the envelope constitutes an oil reservoir 29. This reservoir is covered by a disc 30 fixed in the race-ring 4 and surrounding the conical end section 31 of shaft 2 with a radial clearance of a width of some hundredths of a millimeter. The oil travels from the reservoir 29 along the conical portion 31 of the shaft 2 to the row of balls 5', owing to the surface tension and the centrifugal force acting on the oil during rotation of shaft 2. Removal of oil from the reservoir results in a reduction of the pressure therein so that air is sucked in through a very narrow bore 32 provided in the disc 30, near its periphery. The oil flowing along the inner wall of the race-ring 4, after having lubricated the raceways, clogs the bore 32 and flows on the slightly concave surface of the disc 30 towards the conical end portion 31 of shaft 2. The air pressure in the oil reservoir 29 is slightly reduced as long as the shaft rotates.

In the assembly of the apparatus, preferably the reservoirs 18 and 29 are filled with oil before the shaft 2 is mounted in place, the upper bearing being inverted, and the shaft then placed into the still inverted bearing. Thereafter, the lower bearing is placed on the shaft, likewise in its inverted position whereby the oil is caused to slowly expand over the surface of the disc 30, while the air pressure in the reservoir 29 is reduced. As soon as the shaft portion 31 fills the central hole of disc 30, the oil ceases flowing. Now, only the final adjustment of the play between the two bearings remains to be made. The assembly of the apparatus, however, may also proceed with the two bearings occupying the positions shown in Fig. 1, by filling the reservoir 29, mounting shaft 2 and the upper bearing in position, filling the reservoir 18, and then mounting the membrance 8 and screw 9.

The quantity of oil drawn towards the raceways of the upper and lower bearings may easily be controlled by a suitable adaptation of the shape of the shaft portions 17 and 31 having upwardly increasing diameters. If these shaft portions are conical, this control may involve adapting the top angle of the cone to the speed of rotation of the shaft.

Figure 2:
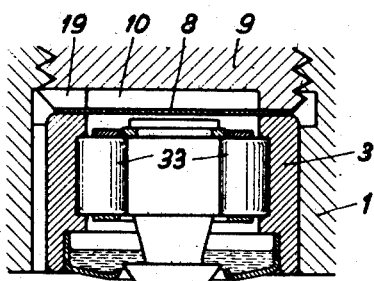
Figure 3:
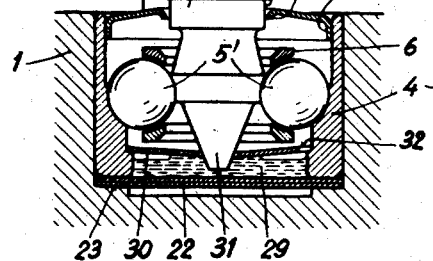

The embodiments of Figs. 2 and 3 differ from the first embodiment only by differences in the types of bearings employed, the embodiment of Fig. 2, using roller bearings including rollers 33 and the embodiment of Fig. 3 sliding bearings including sliding surfaces 34 and bushings 35 made of an appropriate material. As shown by Fig. 3, the bushings 35 are provided with longitudinal recesses 36 permitting the oil flowing from the sliding surfaces 34 to return to the oil reservoirs 18 and 29, respectively. All other arrangements remain the same as in the first embodiment.

Figure 5:
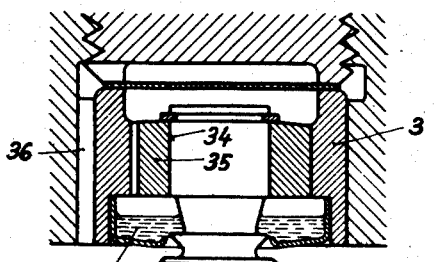
Fig. 5 is an elevational, partly sectional view of an embodiment intended for larger size bearings.

Fig. 5 illustrates another embodiment of the invention, i. e. a device for lubricating the lower sliding bearing of a vertical shaft 37 having a relatively large diameter. The shaft journal has at its lower end a central bore in which is inserted a sleeve 38 dipping into the oil in reservoir 29'. The bottom disc 22' of reservoir 29' is made of slightly compressible material, the same as the bottom disc 22 in the embodiment of Fig. 1. During rotation of the shaft 37, centrifugal action causes the oil to creep along the wall of the conical bore 40 and to escape through the radial channels 41, so as to reach the bushing surface 42 in which turns the journal of the shaft 37. This modification may be readily adapted to apparatus involving ball or roller bearings in place of the sliding bearings shown in Fig. 5.

The invention may be employed in the lubrication of intermediate shaft bearings. In that case the intermediate bearing (of roller, ball or sliding bearing type) is enclosed in an envelope the lower portion of which corresponds to the lower end portions 12, 13, 14, 15, 16 and 17 of one of the upper bearings illustrated in Fig. 1 to 4, whereas, the upper portion of the envelope corresponds to the upper portions, 24, 25, 26, 27 and 28 of the lower bearings shown in Figs. 1 to 4.

It is to be understood that it is not intended to limit the scope of the patent to the exact details of construction, design and operation shown and described as various modifications falling within the scope of the appended claims and involving no departure from the spirit of the invention nor any sacrifice of the advantages thereof, will readily suggest themselves to a person skilled in the art.

I claim:

1. Vertical shaft support comprising in combination, a bearing bushing, a shaft journal formed with an inverted frusto-conical axial section vertically extending into said bushing and capable of acting as a liquid elevator, an oil reservoir concentrically arranged in said bushing and surrounding the narrower part of said journal with a clearance of small capillary width, means for otherwise hermetically sealing off the interior of said bearing, and elastic means adapted to take up any rise of pressure within said sealed space.

2. The shaft support of claim 1, in which the elastic sealing means is an elastically expanding membrane held down on the top of the bearing bushing.

3. The shaft support of claim 1 in which the means for sealing off the interior of said bearing is an inwardly raised edge surrounding an aperture in the bottom portion of the oil reservoir and a journal section of upwardly increasing diameter below the frusto-conical section, said journal section forming with said raised edge a narrow circular capillary gap.

4. The shaft support of claim 1, in combination with a bearing housing, a screw above the bearing bushing accommodated in said housing, an elastic membrane, which forms the elastic sealing means, held applied onto said bearing bushing by said screw and a cavity in the screw bottom face communicating through a radial notch with the outer air.

5. The shaft support of claim 1 as applied to the bottom end of the shaft in combination with a disc of compressible material sealing a bottom cavity of said bushing, said disc being formed with a narrow vent.

ROBERT ANNEN.

References Cited in the file of this patent

UNITED STATES PATENTS

| Number | Name | Date |
|---|---|---|
| 1,827,409 | Waring | Oct. 13, 1931 |
| 1,920,326 | Schuck | Aug. 1, 1933 |
| 2,000,276 | Delaval-Crow | May 7, 1935 |
| 2,061,187 | Colvin | Nov. 17, 1936 |